(12) United States Patent
Harlow

(10) Patent No.: US 9,040,901 B2
(45) Date of Patent: May 26, 2015

(54) PROCESS FOR ANALYZING GAS EMITTED DURING DRILLING OF A BOREHOLE

(71) Applicant: HRH Limited, Aberdeen (GB)

(72) Inventor: Christopher John Harlow, Ellon (GB)

(73) Assignee: HRH LIMITED, Aberdeen (GB)

( * ) Notice: Subject to any disclaimer, the term of this patent is extended or adjusted under 35 U.S.C. 154(b) by 142 days.

(21) Appl. No.: 13/870,660

(22) Filed: Apr. 25, 2013

(65) Prior Publication Data

US 2013/0284910 A1 Oct. 31, 2013

(30) Foreign Application Priority Data

Apr. 27, 2012 (GB) .................................. 1207362.3

(51) Int. Cl.
*G01V 9/00* (2006.01)
*E21B 49/00* (2006.01)

(52) U.S. Cl.
CPC .............. *G01V 9/007* (2013.01); *E21B 49/005* (2013.01)

(58) Field of Classification Search
CPC ......... E21B 49/005; G01V 9/00; G01V 9/007
USPC .......................................... 250/253, 254, 255
See application file for complete search history.

(56) References Cited

U.S. PATENT DOCUMENTS 7,210,342 B1 5/2007 Sterner et al.
7,395,691 B2 7/2008 Sterner et al.

FOREIGN PATENT DOCUMENTS

| GB | 2433273 A | 6/2007 |
|---|---|---|
| GB | 2491443 A | 12/2012 |
| WO | WO 00/50876 A1 | 8/2000 |
| WO | WO 2005/089399 A2 | 9/2005 |

OTHER PUBLICATIONS

Great Britain Search Report for Application No. GB 1207362.3 dated Aug. 10, 2012, 1 page.
Andreas Briner et al., "Application of Novel Technologies helps unlocking deep Omani Gas," SPE International, 17 pages, 2012.
Herbert Hoover et al., "A Preliminary Report on the Application of the Mass Spectrometer to Problems in the Petroleum Industry," New York Meeting, Feb. 1940, pp. 100-106.
Essential Statistics, Regression and Econometrics, Gary Smith 2011, Academic Press, 1 page.

*Primary Examiner* — Mark R Gaworecki
(74) *Attorney, Agent, or Firm* — Howard & Howard Attorneys PLLC

(57) ABSTRACT

A process analyzes gases emitted during drilling of a borehole using oil based mud. The process comprises (a) using mass spectrometry, analyzing the gas recovered during drilling through a hydrocarbon-poor zone at spaced apart locations to provide a mass spectrum for the gas emitted at each of the locations; (b) using mass spectrometry, analyzing the gas recovered during drilling through a hydrocarbon-rich zone at one location to provide a mass spectrum for the gas emitted at the location; (c) using spectra from the measurements in (a) to extrapolate and predict a peak in a mass spectrum caused by compounds in the mud at a time when the drilling is proceeding through the hydrocarbon-rich zone; and (d) comparing the spectrum obtained in (b) with the predicted spectrum obtained in (c) to further predict at least one of the quantity and identity of the formation gases emitted from the hydrocarbon-rich zone.

19 Claims, 1 Drawing Sheet

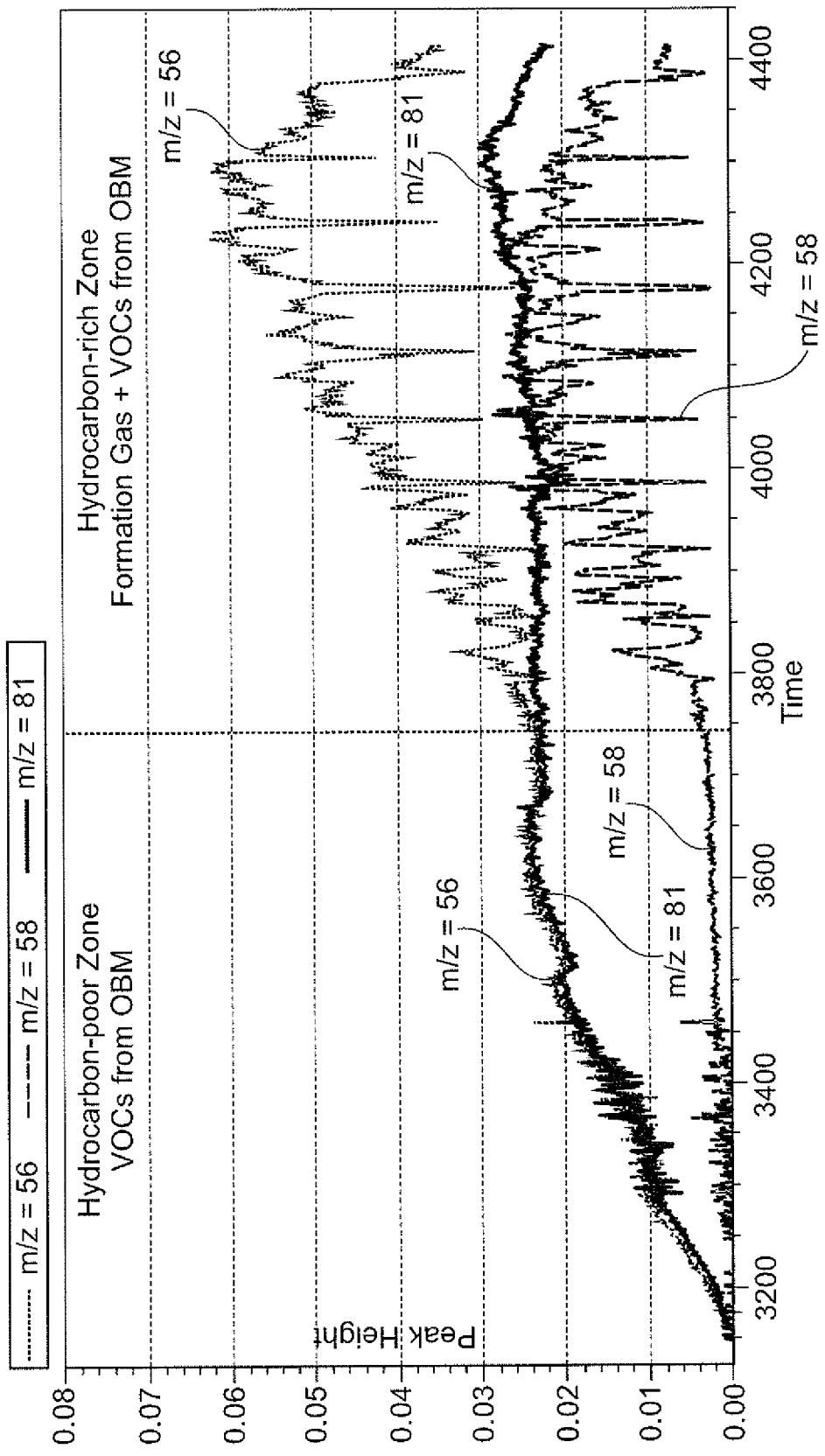

PROCESS FOR ANALYZING GAS EMITTED DURING DRILLING OF A BOREHOLE

RELATED APPLICATIONS

This application claims priority to and all the advantages of Great Britain Patent Application No. GB 1207362.3, filed on Apr. 27, 2012.

BACKGROUND OF THE INVENTION

1. Field of the Invention

This invention relates to a process for analysing gas emitted during drilling of a borehole, especially hydrocarbon gas.

2. Background of the Art

The exploration and recovery of hydrocarbons from reservoirs is an expensive and complex process. Once a potential reservoir is identified an exploratory well may be drilled in order to determine the amount and type of hydrocarbons present. Once satisfied that there is sufficient hydrocarbons present to make it commercially worthwhile to extract, a well is also drilled which will eventually be used to recover the hydrocarbons.

In either case it is useful to know as much as possible about the nature of the reservoir, e.g. water content, porosity, and particularly the hydrocarbons present, e.g. their quantity, chain length etc. In the case of exploratory wells, this information may be used to determine whether to proceed with extracting hydrocarbons from the reservoir, and in the case of drilling a producing well, the information can be used to modify remaining options in the well design, and/or project future returns from the well. Information can also be useful for other types of wells, e.g. injection wells.

It is known to analyse the formation gases emitted during drilling, using a mass spectrometer, which elicits information as to the nature of the reservoir especially the hydrocarbons in the reservoir. Whereas conventional FID gas chromatography provides information about chain alkanes with 1 to 5 carbon atoms in each molecule (methane-pentane), mass spectrometry provides information about for example chain alkanes with 1 to 10 or more carbon atoms in each molecule (methane-decane), cyclic alkanes with 5 to 10 or more carbon atoms in each molecule, aromatic compounds with 6 to 10 or more carbon atoms in each molecule and a number of inorganic gases including carbon dioxide, nitrogen, hydrogen and helium.

When drilling, it is conventional to use a drilling fluid sometimes called 'drilling mud'. The drilling fluid serves to cool a drill bit used to cut into the formation, lubricates the drill bit and also suspends and transfers the drill cuttings back to the surface.

The use of oil-based mud (OBM) (including synthetic oil-based mud (SOBM)) for drilling fluid is becoming increasingly popular because it helps to better lubricate the drill bit and mitigates formation damage. OBM including SOBM contains volatile organic compounds (VOCs) which mix with the gas from the formation and so affect the mass spectrometer results. Accordingly, determining the portion of the results which are due to the formation gas (and which are indicative the nature of the reservoir and especially the hydrocarbon content) and those that are due to the VOCs in the mud is challenging. The use of OBM or SOBM thus results in less accurate or simply less information on the nature of the reservoir and its hydrocarbon content.

The inventors of the present invention have noted that the precise VOC content of OBMs and SOBMs vary from product to product and even batch to batch, and indeed the proportions of the different ingredients in drilling mud is often varied in order to best suit the particular conditions of the borehole being drilled. Accordingly the chemistry of the mud and its fingerprint mass spectrum varies widely. As a further complication it is thought that the temperature variance in the borehole, which tends to increase the deeper it gets, causes a differing amount and type of VOCs to be released from the drilling mud. Thus interpretation of spectra produced from gases released from the borehole during drilling is very difficult if not impossible, when using oil based mud, because of the uncertain and variable composition of the gases emitted from the oil based mud.

An object of the present invention is to provide more information on the nature of the reservoir and especially the nature of the hydrocarbon content therein, based on mass spectrometer analysis of the gases recovered during drilling a borehole.

SUMMARY OF THE INVENTION

According to a first aspect of the present invention there is provided a process to analyse gases emitted drilling a borehole in a formation using oil based mud, the formation having a hydrocarbon-poor zone and a hydrocarbon-rich zone, the process comprising:
(a) using mass spectrometry, analysing the gas recovered during drilling of the borehole through the hydrocarbon-poor zone, at at least two spaced apart locations, to provide a mass spectrum for the gas emitted at each of said two spaced apart locations;
(b) using mass spectrometry, analysing the gas recovered during drilling of the borehole through the hydrocarbon-rich zone, at at least one location, to provide a mass spectrum for the gas emitted at at least said one location;
(c) using the at least two spectra from the spaced apart measurements in part (a) to extrapolate and predict at least one peak in a mass spectrum which would be caused by compounds in the oil based mud, at a time when the drilling is proceeding through the hydrocarbon-rich zone;
(d) comparing the spectrum obtained in step (b) with the predicted spectrum obtained in step (c) to further predict at least one of the quantity and identity of the formation gases emitted from the hydrocarbon-rich zone.

With the information gained in step (d), a step (e) may be performed, step (e) being using the predicted composition of the gases to provide information on the hydrocarbon-rich zone of the formation especially information on the hydrocarbon content.

Preferably step (c) is repeated to predict more than one peak in a spectrum, and preferably predicts the entire spectrum, up to a mass to charge ratio of 120 and optionally up to 140 or perhaps up to 200 or more.

Step (c) may include predicting the magnitude of each peak in a spectra caused by compounds in the oil based mud when the drilling is proceeding through the hydrocarbon-rich zone. Thus for each peak, a separate model may be produced to predict its prevalence when the drilling is proceeding through the hydrocarbon-rich zone.

The hydrocarbon-rich zone of the formation is typically a hydrocarbon reservoir or potential reservoir and a hydrocarbon-poor zone normally has either essentially no hydrocarbons present which would be released from the drilling or only dry gas (chain alkanes with 1 or 2 atoms per molecule, i.e. methane and ethane). Thus there is normally more hydrocarbons in the hydrocarbon-rich zone compared to the hydrocarbon-poor zone, often more than 50%, sometimes 100% more. There may be 100-1,000% more or even greater than 1000% more hydrocarbons in the hydrocarbon-rich zone compared to the hydrocarbon-poor zone. In particular, the hydrocarbon-poor zone preferably emits minimal or no hydrocarbon gases with 3 or more atoms per molecule (propane and heavier hydrocarbons). The presence of methane and ethane can be more easily discriminated when analysing the results and so it is not so significant if the hydrocarbon-poor formation emits such gases. The step (d) may comprise subtracting the predicted peak or peaks (optionally forming a spectrum) obtained in step (c) from the spectrum obtained in step (b) to further predict the composition of the formation gases emitted from the hydrocarbon-rich zone.

The inventors of the present invention have thus devised a process where the data regarding the formation and hydrocarbons therein can more accurately be determined, in spite of the variable results caused by the VOCs in the OBM. Indeed it has been discovered by the present inventors, that despite the wide variance in the composition and nature of OBM, which varies product to product, batch to batch for the same product, can be deliberately varied even for the same batch; as well as, it is understood, the differing VOCs emitted from the drilling mud at different temperatures and concentrations at different positions in the well; it is still possible to gain more useful spectra for the gases representative of the formation and especially hydrocarbons therein, by following a procedure described herein.

Normally in step (a) the gas recovered during drilling of the borehole through the hydrocarbon-poor zone is analysed at at least three spaced apart locations, preferably more than three spaced apart locations. Preferably there are more than 10 said spaced apart locations used accordingly in step (a) and there may be many more such as up to 100, up to 1000 or indeed more. The more separate locations in step (a) the better the accuracy of the prediction in step (c). The different spectra may be spaced apart by taking a measurement at a regular period of time whilst drilling, such as every minute.

Step (c) may include:
(i) choosing a reference peak in the spectra obtained in step (a) which relates to species predominantly, preferably exclusively, emitted from the drilling mud not the formation;
(ii) determining a mathematical relationship between the reference peak and a peak of interest using the at least two spectra obtained in step (a);
(iii) using said mathematical relationship determined in step (ii) to predict the size of said peak of interest obtained in step (b) which is the result of the drilling mud only;
(iv) using the prediction from step (iii), determining the proportion of the peak of interest found in step (b) resulting from formation gases.

Step (iv) may be performed by comparison, more normally subtraction, of the peak predicted in step (iii) from the peak obtained in step (b).

A 'peak of interest' may be a peak where there there is uncertainty over the cause of its origin (e.g. caused by formation gases or VOCs from the mud), or more often uncertainty over the relative contributions from the formations gases and the VOCs which together caused the peak.

In step (c) curve fitting mathematics may be used to determine a relationship between the gases emitted during drilling through the hydrocarbon-poor zone primarily due to the VOCs in the OBM, and the temperature/position in the borehole. More especially, in step (c) the curve fitting mathematics may be used to determine a relationship between the reference peak and a peak of interest, from gases emitted during drilling through the hydrocarbon-poor zone primarily due to the VOCs in the OBM. For example known statistical methods may be used such as regression analysis where $R^2$ defines the best curve. Using said relationship, which may be plotted as a line on a graph, data can be predicted of the portion of the spectra results obtained during drilling of the hydrocarbon-rich zone primarily due to the VOCs. In step (d) the difference between the predicted amount primarily due to the VOCs and the actual spectra results can normally be taken to represent the gases present primarily due to the formation gases, which in turn is representative of the nature of the formation, especially the nature of the hydrocarbons in the formation.

Oil based mud (OBM) as described herein includes synthetic oil-based mud. Preferred embodiments of the invention are particularly suitable for use with boreholes being drilled using synthetic oil-based mud.

Steps (a) and (b) may be conducted in either order, although step (a) is normally conducted first.

BRIEF DESCRIPTION OF THE DRAWING

Embodiments of the present invention will now be described, by way of example only, with reference to the accompanying FIGURE, in which:

FIG. 1 is a graph showing the change over time of selected mass spectrometer peaks during drilling through a hydrocarbon-poor zone and a hydrocarbon-rich zone.

DETAILED DESCRIPTION OF EMBODIMENTS

Embodiments of the present invention provide a process to predict which peaks of a mass spectrum of gases emitted during drilling using oil based mud are a result of formation gases, rather than VOCs within the drilling mud.

Mass spectra are taken of the gases emitted from drilling a borehole using synthetic oil-based mud. These include gases emitted from the formation which are indicative of the reservoir hydrocarbons, and also Volatile Organic Compounds (VOCs) emitted from the synthetic oil-based mud. The spectra are taken before (or after) the drilling enters the hydrocarbon-bearing portion of the formation and so a series of spectra showing the VOCs only, and, when drilling through the hydrocarbon bearing formation (i.e. a hydrocarbon 'rich' area rather than a 'poor' area of the formation), a series of spectra showing VOCs and formation gases are obtained.

The resulting information can be presented as a variance in particular peaks' height against time in order to see the variance over time in the amount of the species giving rise to such peaks. For example, a peak at a mass/charge (m/z) ratio of 58 is indicative of butane, and a graph of the peak height at 58 against time (or depth) may be plotted using the data from the separate spectra to see how butane levels vary with time (or depth).

Such a graph is shown in FIG. 1. The results on the left hand side (between 3000s and 3700s), were taken before the drilling proceeded through a hydrocarbon bearing formation, and on the right hand side of the graph (between 3700s and 4400s) whilst the drilling was proceeding through the hydrocarbon bearing formation. Clearly it is seen that the m/z ratio of 58 (butane) is largely absent until the drilling proceeds through the hydrocarbon bearing formation. M/z ratios of 56 and 81 are also shown, which the skilled person will appreciate that m/z is representative of a C4 fragment commonly produced by many hydrocarbons, including chain alkanes and cyclic alkanes. The skilled person will also appreciate that m/z=81 is a C6 fragment produced by many hydrocarbons with the general formula $C_n H_{2n-2}$.

A first stage in the procedure is to identify a reference peak which is associated only with the VOCs, not with the formation gases. As can be seen from FIG. 1, there is no increase in the amount of m/z ratio 81 and so this indicates that the species causing this peak is coming from the VOCs not the formation gases. Moreover, during drilling, the process is paused regularly whilst a further piece of drill pipe is added to the drill stem. This results in less or no formation gases being released since no drilling is taking place. It can be seen in the graphs for m/z ratios of 56 and 58 that sharp troughs are present, and these indicate the sudden reduction in gases causing these peaks, and so are indicative that these gases are emitted from the formation. In contrast, no sharp troughs in the graphs for the m/z ratio of 81 are present. Thus it can be concluded that the species causing the peak at m/z ratio of 81 is emanating from the VOCs not the formation gases and is therefore suitable as an OBM reference peak. The inventors of the present invention have noted that for many types of synthetic OBM, peaks 81, 97 and 111 are suitable as the reference m/z ratio peak. In practice, the user enters the reference peak number into the software program.

The height of the reference m/z ratio peak thus provides an indicator of the amount of OBM VOCs present.

Once the reference m/z ratio peak has been determined, 81 in this example, it can be used to predict the proportion of other gases which emanate from the formation gases and from the VOCs. To do this, a set of mass spectra in the hydrocarbon-poor zone is selected which covers a suitable range of values of the reference m/z ratio peak, and hence a suitable range of concentrations of the OBM. In FIG. 1, the set of scans from approximately 3200s to approximately 3600s would be suitable. Often the number of mass spectra selected would typically range from several 10 s to several 100 s.

Using the selected set of mass spectra, the mathematical relationship(s) between the reference m/z ratio peak and other m/z ratio of other peaks of interest are determined using regression analysis as described in, for example, Gary Smith (2011), Essential Statistics, Regression and Econometrics. Academic Press. The method used in preferred embodiments of the present invention allows each mathematical relationship to be linear, polynomial, logarithmic or exponential. A threshold value of $R^2$ of 0.1 (but user selectable) is used, below which no relationship is determined.

The relationship between the reference m/z ratio to other m/z ratios of interest may be determined for any or all of the observed peaks in the mass spectra. In one case the relationship for all m/z ratio peaks is determined and in another only the relationship between the reference m/z ratio peak and peaks of particular relevance to the quantitative determination of the abundance of formation gases is determined.

Analysis of each of the mass spectra from the hydrocarbon bearing formation is performed. A measure of the amount of OBM present in each mass spectrum from the hydrocarbon bearing formation is determined from the height of the reference m/z ratio peak in the mass spectrum. Using the mathematical relationships determined, the true height of the peaks of interest is calculated by first calculating the contribution from the VOCs from OBM and then subtracting this from the observed peak height in the mass spectrum under analysis. Having thus removed the influence of OBM, normal analysis of the mass spectra to determine the quantities of formation gases present can be carried out.

In a simple example, it may be that the peak of interest is always a factor or 0.6 times the size of the reference peak throughout the spectra taken from the before entering the hydrocarbon bearing formation. This can then be extrapolated to the hydrocarbon bearing formation and the amount of the same gas giving rise to the peak of interest from the formation determined by the amount of the reference peak in the hydrocarbon rich area and applying the mathematical relationship (factor of 0.6) to the peak of interest to determine the amount of gas from the VOC. This is then subtracted from the total height of the peak of interest from the spectra of the hydrocarbon bearing zone to determine the amount of the peak due to formation gases. This can then be interpreted using known methods to elicit information on the hydrocarbons in the formation. More often there is a more complex relationship between the reference peak and the peak of interest: they may be polynomial, logarithmic or exponential as well as simply linear.

The method of determining the mathematical relationship between the reference m/z ratio peak and the peaks of interest allows the method to extrapolate beyond the range of values of the reference mass to chart ratio peak. Indeed, the nature of the drilling process, which is for the temperature of the drilling mud to increase with time as drilling proceeds and the hole deepens, means that it is normally the case that extrapolation is necessary.

Note that in practice the entire method is carried out using a software program designed to lead the end user through the stages and perform the necessary calculations. Use of the software program is not, however, mandated and it would be possible to carry out the procedure manually with the assistance of a more generic calculation program such as Microsoft Excel or similar.

Note also that the procedure can be carried out while the well is drilling, in order to provide accurate gas information as soon as is possible, or it may be carried out after the well has been completed.

Embodiments of the invention benefit in that the method requires no prior knowledge of the composition of the drilling mud and indeed certain embodiments require no identification of primary and secondary mud components.

Improvements and modifications may be made without departing from the scope of the invention.

The invention claimed is:

1. A process to analyse gases emitted drilling a borehole in a formation using oil based mud, the formation having a hydrocarbon-poor zone and a hydrocarbon-rich zone, the process comprising:
   (a) using mass spectrometry, analysing the gas recovered during drilling of the borehole through the hydrocarbon-poor zone, at at least two spaced apart locations, to provide a mass spectrum for the gas emitted at each of said two spaced apart locations;
   (b) using mass spectrometry, analysing the gas recovered during drilling of the borehole through the hydrocarbon-rich zone, at at least one location, to provide a mass spectrum for the gas emitted at at least said one location;
   (c) using the at least two spectra from the spaced apart measurements in step (a) to extrapolate and predict at least one peak in a mass spectrum which would be caused by compounds in the oil based mud, at a time when the drilling is proceeding through the hydrocarbon-rich zone;
   (d) comparing the spectrum obtained in step (b) with the predicted at least one peak in the mass spectrum obtained in step (c) to further predict at least one of the quantity and identity of the formation gases emitted from the hydrocarbon-rich zone.

2. A process as claimed in claim 1, comprising using the information gained in step (d), performing a step (e), step (e) comprising using the predicted at least one of the quantity and identity of the formation gases emitted from the hydrocarbon-rich zone to provide information on the hydrocarbon-rich zone of the formation.

3. A process as claimed in claim 1, wherein step (d) comprises subtracting the predicted spectra obtained in step (c) from the spectrum obtained in step (b) to further predict the composition of the formation gases emitted from the hydrocarbon-rich zone.

4. A process as claimed in claim 1, wherein in step (a) the gas recovered during drilling of the borehole through the hydrocarbon-poor zone is analysed at at least three spaced apart locations.

5. A process as claimed in claim 4, wherein in step (a) there are more than 100 said spaced apart locations.

6. A process as claimed in claim 1, wherein in step (c) curve fitting mathematics are used to determine a relationship between the gases emitted during drilling through the hydrocarbon-poor zone primarily due to VOCs in the oil based mud and the temperature/position in the borehole.

7. A process as claimed in claim 1, wherein in step (c) curve fitting mathematics is used to determine a relationship between a reference peak in the spectra obtained in step (a) and a peak of interest, from gases emitted during drilling through the hydrocarbon-poor zone primarily due to VOCs in the oil based mud.

8. A process as claimed in claim 1, wherein step (c) is repeated to predict more than one peak in a spectrum, and predicts the entire spectrum, up to a mass to charge ratio of up to 200.

9. A process as claimed in claim 1, wherein step (c) includes predicting the magnitude of each peak in a spectra caused by compounds in the oil based mud when the drilling is proceeding through the hydrocarbon-rich zone.

10. A process as claimed in claim 1, wherein the oil based mud is synthetic oil-based mud.

11. A process as claimed in claim 1, wherein step (a) is performed before step (b).

12. A process to analyse gases emitted drilling a borehole in a formation using oil based mud, the formation having a hydrocarbon-poor zone and a hydrocarbon-rich zone, the process comprising:
 (a) using mass spectrometry, analysing the gas recovered during drilling of the borehole through the hydrocarbon-poor zone, at at least two spaced apart locations, to provide a mass spectrum for the gas emitted at each of said two spaced apart locations;
 (b) using mass spectrometry, analysing the gas recovered during drilling of the borehole through the hydrocarbon-rich zone, at at least one location, to provide a mass spectrum for the gas emitted at at least said one location;
 (c) using the at least two spectra from the spaced apart measurements in step (a) to extrapolate and predict at least one peak in a mass spectrum which would be caused by compounds in the oil based mud, at a time when the drilling is proceeding through the hydrocarbon-rich zone; including:
  (i) choosing a reference peak in the spectra obtained in step (a) which relates to species predominantly emitted from the drilling mud compared to the formation;
  (ii) determining a mathematical relationship between the reference peak and a peak of interest using the at least two spectra obtained in step (a);
  (iii) using said mathematical relationship determined in step (ii) to predict the size of a peak of interest obtained from the mass spectrum for the gas emitted at at least said one location in step (b) which is the result of the drilling mud;
  (iv) using the prediction from step (iii), more accurately determining the proportion of the peak of interest found in step (b) resulting from formation gases;
 (d) comparing the spectrum obtained in step (b) with the predicted at least one peak in the mass spectrum obtained in step (c) to further predict at least one of the quantity and identity of the formation gases emitted from the hydrocarbon-rich zone.

13. A process as claimed claim 12, wherein step (iv) is performed by comparison of the peak predicted in step (iii) from the peak obtained in step (b).

14. A process as claimed in claim 12, wherein in step (c) curve fitting mathematics are used to determine a relationship between the gases emitted during drilling through the hydrocarbon-poor zone primarily due to VOCs in the oil based mud and the temperature/position in the borehole.

15. A process as claimed in claim 12, wherein in step (c) curve fitting mathematics is used to determine a relationship between the reference peak and a peak of interest, from gases emitted during drilling through the hydrocarbon-poor zone primarily due to VOCs in the oil based mud.

16. A process as claimed in claim 12, wherein step (c) is repeated to predict more than one peak in a spectrum, and predicts the entire spectrum, up to a mass to charge ratio of up to 200.

17. A process as claimed in claim 12, wherein step (c) includes predicting the magnitude of each peak in a spectra caused by compounds in the oil based mud when the drilling is proceeding through the hydrocarbon-rich zone.

18. A process as claimed in claim 12, wherein the oil based mud is synthetic oil-based mud.

19. A process as claimed in claim 12, wherein step (a) is performed before step (b).

* * * * *